US012054380B2

(12) United States Patent
Ramirez

(10) Patent No.: US 12,054,380 B2
(45) Date of Patent: Aug. 6, 2024

(54) AUTOMATED FUELING ASSEMBLY

(71) Applicant: Teresa Ramirez, Porterville, CA (US)

(72) Inventor: Teresa Ramirez, Porterville, CA (US)

( * ) Notice: Subject to any disclaimer, the term of this patent is extended or adjusted under 35 U.S.C. 154(b) by 273 days.

(21) Appl. No.: 17/737,774

(22) Filed: May 5, 2022

(65) Prior Publication Data

US 2023/0356994 A1 Nov. 9, 2023

(51) Int. Cl.
*B67D 7/04* (2010.01)
*B67D 7/10* (2010.01)

(52) U.S. Cl.
CPC .......... *B67D 7/0401* (2013.01); *B67D 7/106* (2013.01); *B67D 2007/0417* (2013.01); *B67D 2007/0419* (2013.01); *B67D 2007/043* (2013.01); *B67D 2007/0442* (2013.01); *B67D 2007/0463* (2013.01)

(58) Field of Classification Search
CPC .......... B67D 7/0401; B67D 2007/0442; B67D 2007/0403; B67D 2007/0457
USPC .................................................. 141/83, 231
See application file for complete search history.

(56) References Cited

U.S. PATENT DOCUMENTS 3,364,940 A * 1/1968 Ginsburgh .......... B67D 7/0401 141/227
3,642,036 A * 2/1972 Ginsburgh ................ B25J 5/06 141/94
4,735,289 A * 4/1988 Kenyon ............... G07F 19/201 109/19
4,793,429 A * 12/1988 Bratton .................... G01G 3/13 177/1
4,881,581 A * 11/1989 Hollerback ............ B60K 15/04 222/2
5,238,034 A * 8/1993 Corfitsen ............. B67D 7/0401 251/95
5,644,119 A * 7/1997 Padula .................... G07F 19/20 235/383
6,202,712 B1 * 3/2001 Aguilar ................ B67D 7/0401 141/94
6,237,647 B1 5/2001 Pong
6,279,624 B1 8/2001 Corfitsen
6,338,008 B1 * 1/2002 Kohut .................. B67D 7/0401 700/232
6,382,269 B1 * 5/2002 Tatsuno ............... B67D 7/0401 141/192

(Continued)

FOREIGN PATENT DOCUMENTS

WO WO9854084 12/1998

OTHER PUBLICATIONS

AI translation of FR2780051 (Year: 2024).*

*Primary Examiner* — Timothy P. Kelly
(74) *Attorney, Agent, or Firm* — Want

(57) ABSTRACT

An automated fueling assembly includes a refueling station that is positioned at a gas station for refueling gas burning vehicles. The refueling station includes a control panel that is movably integrated into the refueling station to facilitate a driver of a vehicle to access the control panel. The refueling station includes a robotic arm that is actuatable to extend into a refueling port in the vehicle for refueling the vehicle without requiring the driver to exit the vehicle. A pair of sensing units is each positioned on a driveway adjacent to the refueling station. Furthermore, the refueling station is turned on when each the sensing units senses the weight of the vehicle.

13 Claims, 5 Drawing Sheets

(56) References Cited

U.S. PATENT DOCUMENTS

| | | | | |
|---|---|---|---|---|
| 6,431,226 | B1 * | 8/2002 | Koslowsky | B67D 7/0401 901/41 |
| 8,393,362 | B1 | 3/2013 | Hollerback | |
| 9,169,114 | B2 | 10/2015 | Butler, Jr. | |
| D890,218 | S | 7/2020 | Larsson | |
| 2019/0023557 | A1 | 1/2019 | Wu | |
| 2020/0122998 | A1 | 4/2020 | Stumpf | |
| 2021/0017014 | A1 | 1/2021 | Mouser | |
| 2022/0402746 | A1 * | 12/2022 | Trott | G06Q 50/40 |
| 2023/0150811 | A1 * | 5/2023 | Li | F17C 13/02 141/94 |

* cited by examiner

AUTOMATED FUELING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fueling devices and more particularly pertains to a new fueling device for automatically refueling a vehicle at a gas station. The device includes a refueling station that includes a control panel that is extendable away from the refueling station and a robotic arm that is movably integrated into the refueling station. The device includes a pair of sensing units that are each positioned on a driveway of the gas station for sensing the weight of the vehicle. The control panel extends outwardly toward the vehicle to facilitate the driver of the vehicle to access the control panel for purchasing fuel. The robotic arm extends into a refueling port in the vehicle once the driver has purchased the fuel to refuel the vehicle.

(2) Description of Related Art Including Information Disclosed Under 37 CFR 1.97 and 1.98

The prior art relates to fueling devices including an automated refueling station that includes electronic means of receiving vehicle information from a transponder in the vehicle and a robotic arm which is suspended from an elevated carriage to refuel the vehicle. The prior art discloses a variety of refueling stations that each includes a robotic arm that engages a fuel port on a vehicle for refueling the vehicle. The prior art discloses a refueling station that includes a robotic arm for refueling a vehicle and a lifting unit that aligns the vehicle with the robotic arm. The prior art discloses an autonomous refueling device that includes a payment terminal and a robotic arm that is discrete from the payment terminal.

BRIEF SUMMARY OF THE INVENTION

An embodiment of the disclosure meets the needs presented above by generally comprising a refueling station that is positioned at a gas station for refueling gas burning vehicles. The refueling station includes a control panel that is movably integrated into the refueling station to facilitate a driver of a vehicle to access the control panel. The refueling station includes a robotic arm that is actuatable to extend into a refueling port in the vehicle for refueling the vehicle without requiring the driver to exit the vehicle. A pair of sensing units is each positioned on a driveway adjacent to the refueling station. Furthermore, the refueling station is turned on when each the sensing units senses the weight of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
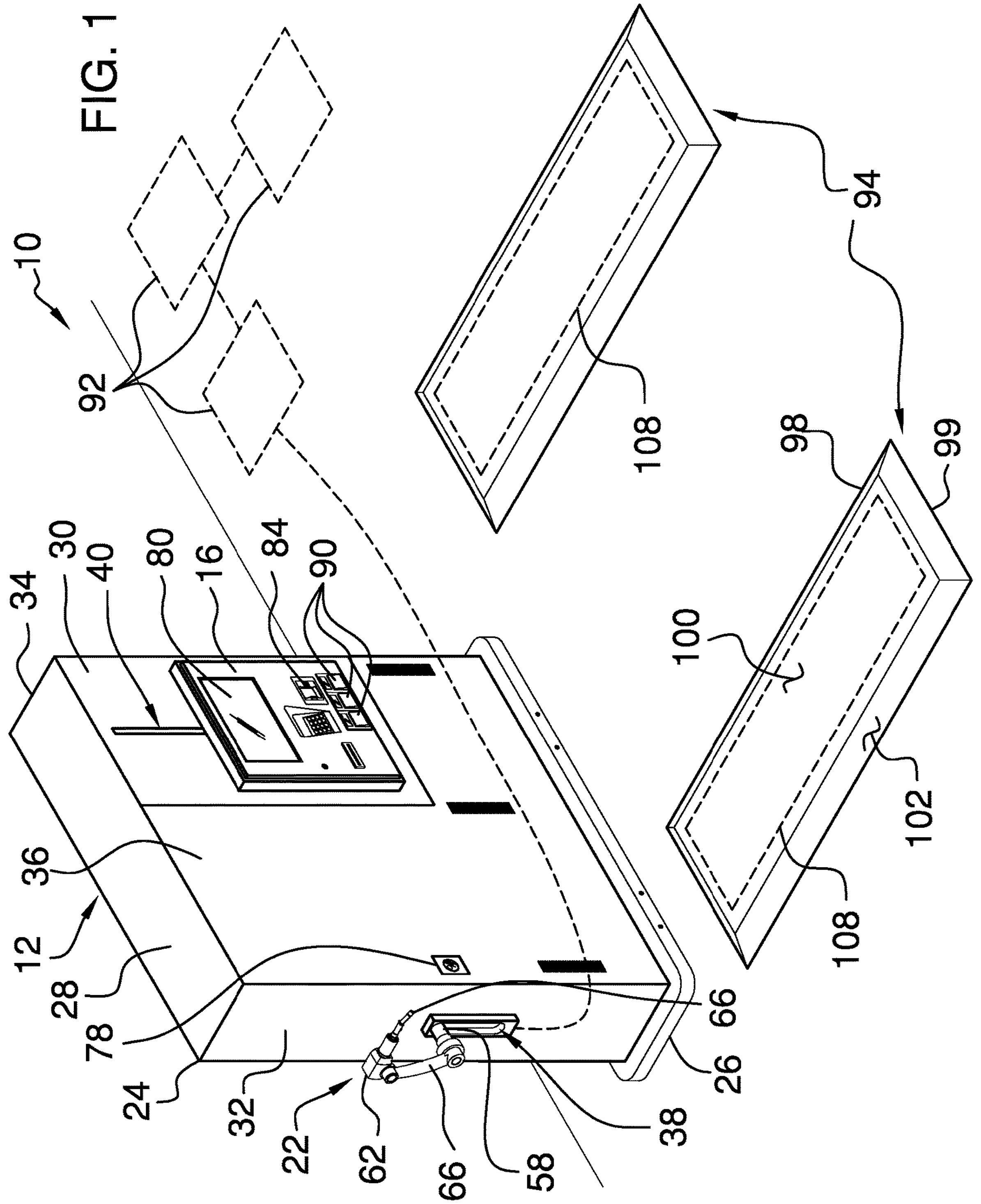
FIG. 1 is a top perspective view of an automated fueling assembly according to an embodiment of the disclosure.
Figure 2:
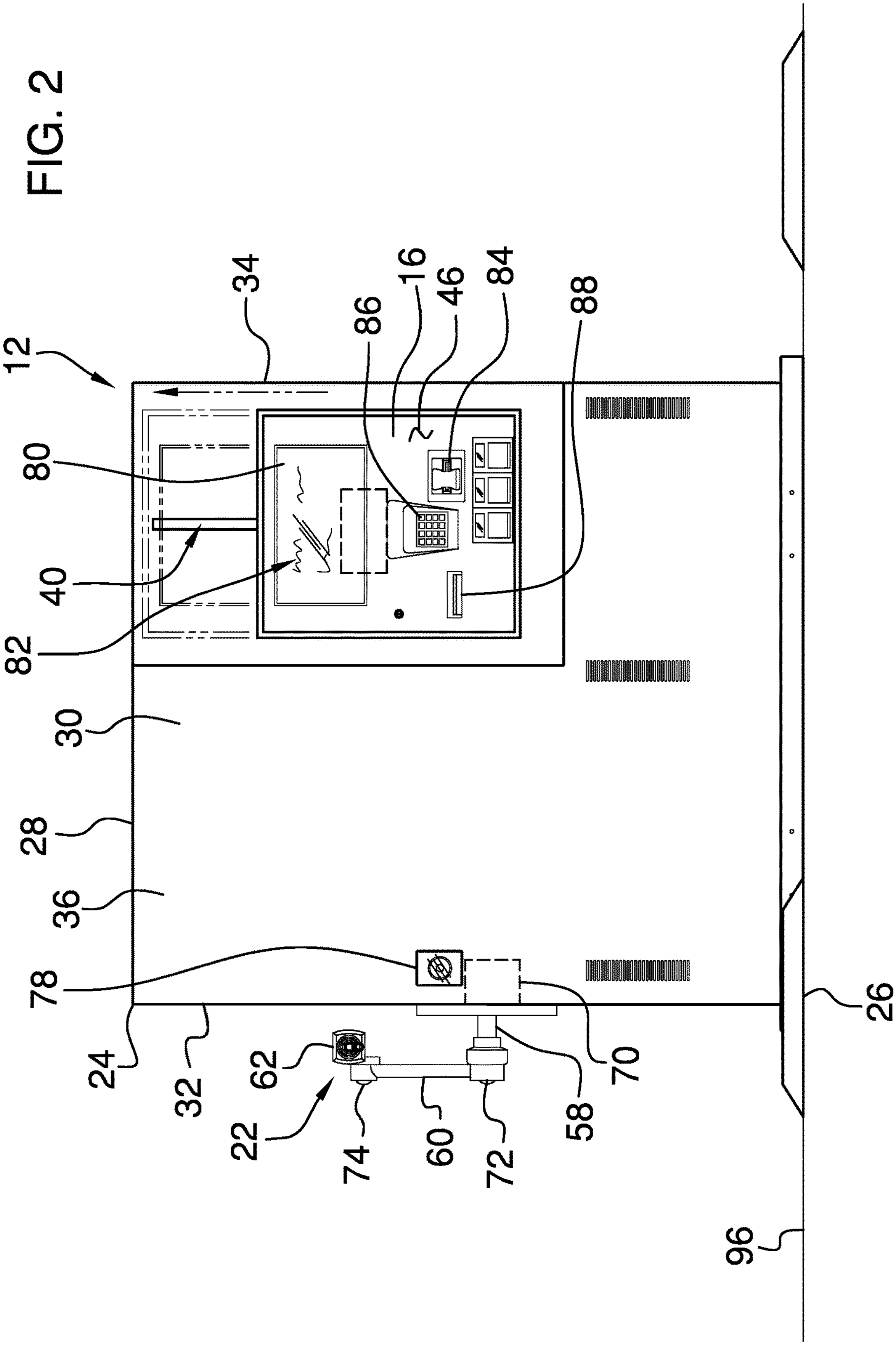
FIG. 2 is a front view of an embodiment of the disclosure.
Figure 3:
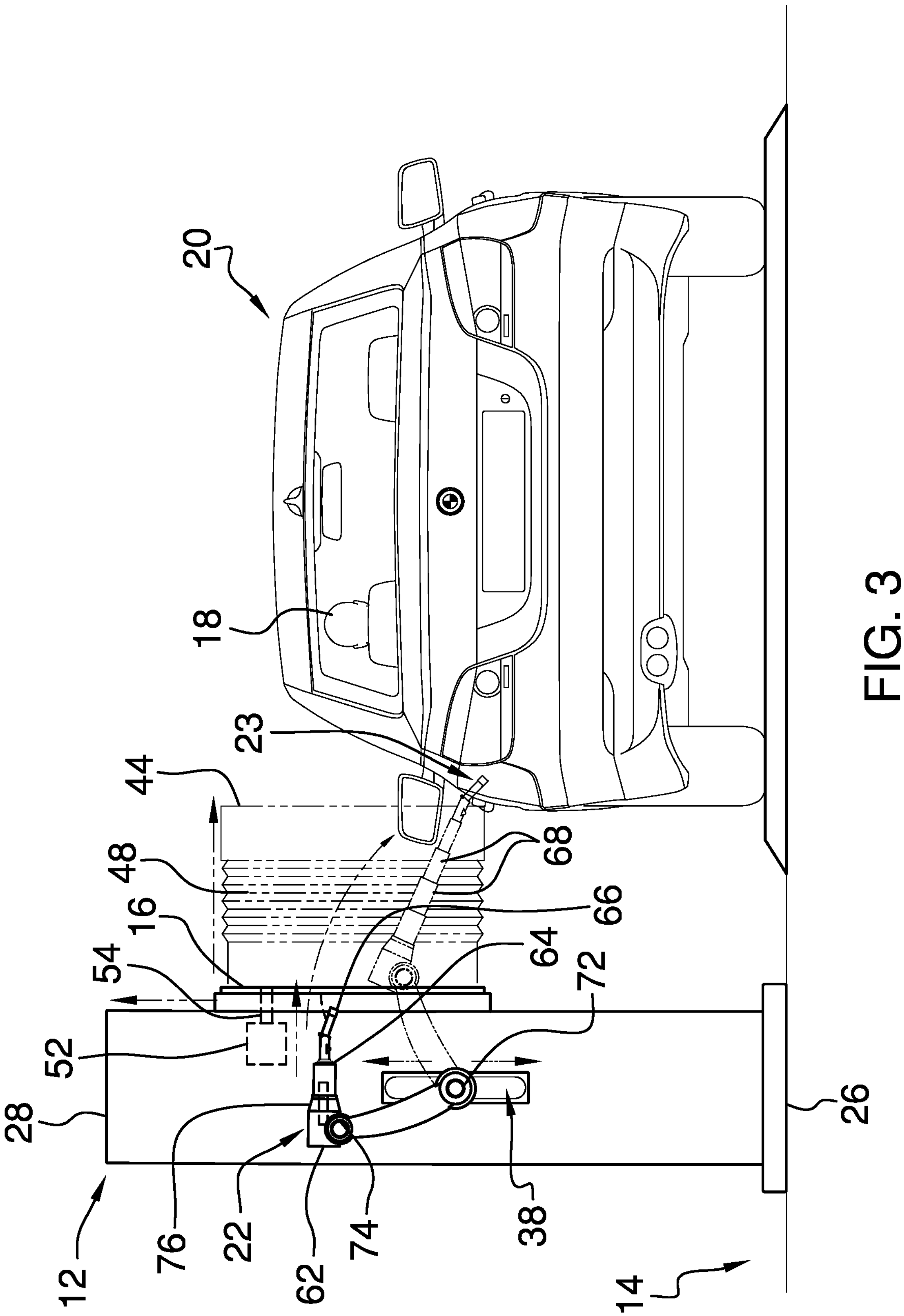
FIG. 3 is a perspective in-use view of an embodiment of the disclosure.
Figure 4:
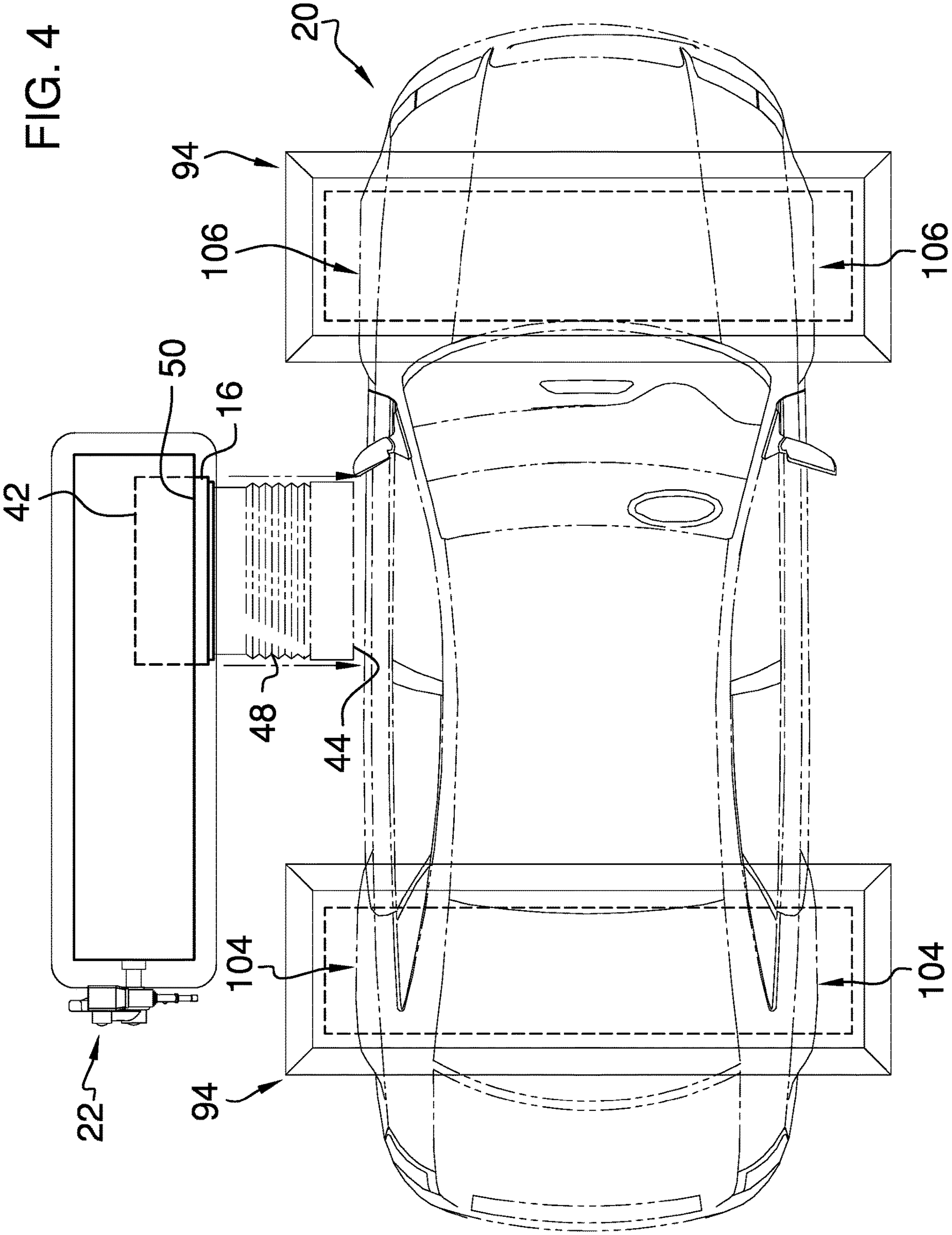
FIG. 4 is a top in-use view of an embodiment of the disclosure.
Figure 5:
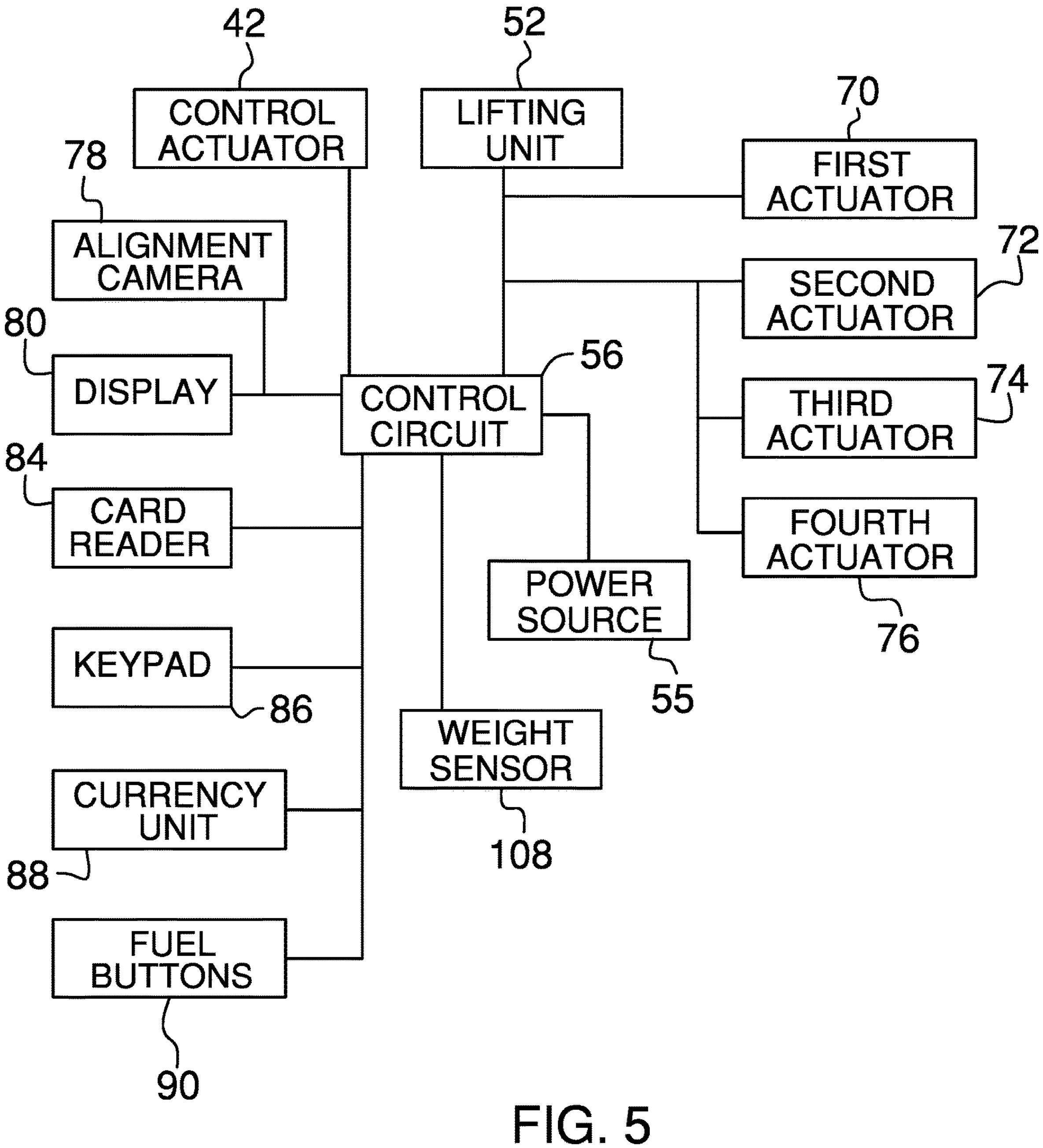
FIG. 5 is a schematic view of an embodiment of the disclosure.

With reference now to the drawings, and in particular to FIGS. 1 through 5 thereof, a new fueling device embodying the principles and concepts of an embodiment of the disclosure and generally designated by the reference numeral 10 will be described.

As best illustrated in FIGS. 1 through 5, the automated fueling assembly 10 generally comprises a refueling station 12 that is positioned at a gas station 14 for refueling gas burning vehicles, and the refueling station 12 includes a control panel 16 that is movably integrated into the refueling station 12. The control panel 16 is actuatable into an extended position thereby facilitating a driver 18 of a vehicle 20 that has parked adjacent to the refueling station 12 to access the control panel 16 without exiting the vehicle 20. The refueling station 12 includes a robotic arm 22 that is movably integrated into the refueling station 12. The robotic arm 22 is actuatable to extend into a refueling port 23 in the vehicle 20 for refueling the vehicle 20 without requiring the driver 18 to exit the vehicle 20. In this way the refueling station 12 can help reduce the transmission of infectious diseases between multiple drivers 18.

The refueling station 12 comprises a housing 24 that has a bottom wall 26, a top wall 28 and an outer wall 30 extending between the bottom wall 26 and the top wall 28, and the outer wall 30 has a first lateral side 32, a second lateral side 34 and a front side 36. The housing 24 has a slot 38 extending through the first lateral side 32 and the slot 38 is elongated to extend substantially between the bottom wall 26 and the top wall 28. The control panel 16 is disposed on the front side 36 and the housing 24 has a channel 40 extending through the front side 36. The channel 40 extends substantially between the bottom wall 26 and the top wall 28, and the channel 40 is positioned closer to the second lateral side 34 than the first lateral side 32.

A control actuator 42 is movably integrated into the front side 36 of the outer wall 30, the control actuator 42 has a distal end 44 with respect to the front side 36 and the control panel 16 is positioned on the distal end 44. The control actuator 42 is actuatable into a retracted position having the control actuator 42 being recessed into the front side 36 such that the control panel 16 is aligned with the front side 36. Conversely, the control actuator 42 is actuatable into an extended position having the control panel 16 being spaced from the front side 36 thereby facilitating the control panel 16 to be accessible to the driver 18 of the vehicle 20. Additionally, the control panel 16 has an exposed surface 46 with respect to the control actuator 42. The control actuator 42 includes a corrugated surround 48 that extends between the front side 36 of the outer wall 30 and a rear side 50 of the control panel 16. Additionally, the control actuator 42 may comprise a linear electromechanical actuator or other type of actuator that can both extend and retract.

A lifting unit 52 is integrated into the housing 24, the lifting unit 52 has an engagement 54 extending outwardly through the channel 40 in the front side 36 of the outer wall 30 of the housing 24 and the engagement 54 travels upwardly or downwardly in the channel 40. The engagement 54 is coupled to the control actuator 42 for moving the control actuator 42 upwardly or downwardly along the front side 36 of the outer wall 30 of the housing 24. In this way the control actuator 42 can be aligned with a driver's side window 54 of a variety of types of vehicles 20, such as sport utility vehicles, compact vehicles and any other vehicles that might have varying heights of driver's side windows with respect to each other. The lifting unit 52 might comprise an electric motor and a gear that engages the housing 24, an electromechanical linear actuator or any other type of actuator that can travel in two directions.

The refueling station 12 includes a control circuit 56 that is positioned in the housing 24 and the control circuit 56 is electrically coupled to a power source 55 comprising an electrical system of the gas station 14. The control circuit 56 receives an actuate input, the control circuit 56 receives a de-actuate input and the control circuit 56 receives a payment input. The control circuit 56 is electrically coupled to the control actuator 42, the control actuator 42 is actuated into the extended position when the control circuit 56 receives the actuate input and the control actuator 42 is actuated into the retracted position when the control circuit 56 receives the de-actuate input. Furthermore, the control circuit 56 is electrically coupled to the lifting unit 52.

The robotic arm 22 includes a first section 58, a second section 60 that is pivotally attached to the first section 58 and a third section 62 that is pivotally attached to the second section 60. The first section 58 extends outwardly from the slot 38 in the first lateral side 32 of the outer wall 30 of the housing 24. The second section 60 lies on a plane that is oriented parallel to the first lateral side 32 of the outer wall 30 and the third section 62 lies on a plane that is oriented parallel to the first lateral side 32 of the outer wall 30. The third section 62 has a distal end 64 with respect to the second section 60 and the robotic arm 22 has a fuel nozzle 66 extending away from the distal end 64 of the third section 62. Additionally, the third section 62 comprises a plurality of telescopic sections 68 that slidably engage each other such that the third section 62 has a telescopically adjustable length.

The robotic arm 22 includes a first actuator 70 that is positioned within the housing 24, the first actuator 70 is electrically coupled to the control circuit 56 and the first actuator 70 urges the first section 58 upwardly or downwardly in the slot 38. The first actuator 70 may comprise an electric motor with a gear that engages the housing 24, an electromechanical linear actuator or other type of actuator that can move in two directions. The robotic arm 22 includes a second actuator 72 that is positioned at an intersection between the first section 58 and the second section 60, the second actuator 72 is electrically coupled to the control circuit 56 and the second actuator 72 rotates the second section 60 about the first section 58. The second actuator 72 may comprise a two direction electric motor, a servo or other type of actuator commonly associated with robotic arms.

The robotic arm 22 includes a third actuator 74 that is positioned at an intersection between the second section 60 and the third section 62. The third actuator 74 rotates the third section 62 about the second section 60 and the third actuator 74 is electrically coupled to the control circuit 56. The third actuator 74 may comprise a two direction electric motor, a servo or other type of actuator commonly associated with robotic arms. The robotic arm 22 includes a fourth actuator 76 that is disposed within the third section 62 for extending and retracting the telescopic sections 68, and the fourth actuator 76 is electrically coupled to the control circuit 56. The fourth actuator 76 may comprise a linear electromechanical actuator or other type of mechanism that is common to extendable robotic arms.

The refueling station 12 includes an alignment camera 78 that is coupled to the front side 36 of the outer wall 30 of the housing 24 such that the alignment camera 78 can capture imagery of the vehicle 20. The alignment camera 78 is electrically coupled to the control circuit 56 and the control circuit 56 analyzes the imagery of the vehicle 20 thereby facilitating the control circuit 56 to actuate the lifting unit 52 to align the actuator with the driver's side window 54. Additionally, the control circuit 56 actuates each of the first actuator 70, the second actuator 72, the third actuator 74 and the fourth actuator 76 to urge the robotic arm 22 into a strategic orientation for inserting the fuel nozzle 66 into the refueling port 23 in the vehicle 20.

The refueling station 12 includes a display 80 which is coupled to the exposed surface 46 of the control panel 16 such that the display 80 is visible to the driver 18 of the vehicle 20. The display 80 is electrically coupled to the control circuit 56 and the display 80 displays indicia 82 comprising words and numbers for communicating operational parameters of the refueling station 12 to the driver 18. The display 80 may comprise a liquid crystal display or other type of electronic display. The refueling station 12 includes a card reader 84 that is integrated into the exposed surface 46 of the control panel 16 thereby facilitating the card reader 84 to receive a financial transaction card for processing a payment. The card reader 84 is electrically coupled to the control circuit 56 and the control circuit 56 receives the payment input when the card reader 84 successfully processes a payment with the financial transaction card.

The refueling station 12 includes a keypad 86 that is integrated into the exposed surface 46 of the control panel 16 such that the keypad 86 is accessible to the driver 18. The keypad 86 is electrically coupled to the control circuit 56 for programming operational parameters into the refueling station 12 including numerical data pertaining to the card reader 84 for processing the payment. The refueling station 12 includes a currency unit 88 that is integrated into the exposed surface 46 of the control panel 16 thereby facilitating the currency unit 88 to insertably receive currency for processing a payment. The currency unit 88 is electrically coupled to the control circuit 56 and the control circuit 56 receives the payment input when the currency unit 88 receives a pre-determined amount of currency.

The refueling station 12 includes a plurality of fuel buttons 90 that is each movably integrated into the exposed surface 46 of the control panel 16 such that each of the fuel buttons 90 is accessible to the driver 18. Each of the fuel buttons 90 is electrically coupled to the control circuit 56 and each of the fuel buttons 90 is in communication with a respective one of a plurality of fuel pumping units 92 in the gas station 14. Additionally, the robotic arm 22 is in fluid communication with each of the fuel pumping units 92 and a respective one of the fuel pumping units 92 is turned on when the fuel button 90 associated with the respective fuel pumping unit 92 is depressed thereby facilitating the robotic arm 22 to dispense fuel into the refueling port 23 in the vehicle 20. The fuel pumping units 92 may comprise fuel pumping units that are commonly employed at gas stations for delivering gasoline to gasoline pumps.

A pair of sensing units 94 is provided and each of the sensing units 94 is positioned on a driveway 96 adjacent to the refueling station 12 such that the vehicle 20 drives over the sensing units 94 when the vehicle 20 parks next to the refueling station 12. Each of the sensing units 94 is in communication with the refueling station 12 and the refueling station 12 is turned on when each the sensing units 94 senses the weight of the vehicle 20. Each of the sensing units 94 comprises a panel 98 that has a lower surface 99, an upper surface 100 and a perimeter surface 102 extending between the lower surface 99 and the upper surface 100. The perimeter surface 102 angles inwardly between the lower surface 99 and the upper surface 100 such that the panel 98 has a trapezoidal shape, and the lower surface 99 rests on the driveway. The panel 98 associated with each of the sensing units 94 is aligned with a respective one of the first lateral side 32 and the second lateral side 34 of the outer wall 30 of the housing 24 thereby facilitating panel 98 associated with each of the sensing units 94 to be aligned with a respective one of a set of rear wheels 104 and a set of front wheels 106 of the vehicle 20.

Each of the sensing units 94 includes a weight sensor 108 that is integrated into the upper surface 100 of the panel 98 such that the weight sensor 108 senses the weight of the vehicle 20 when the vehicle 20 drives onto the panel 98. The weight sensor 108 is electrically coupled to the control circuit 56 and the control circuit 56 receives the actuate input when the weight sensor 108 senses weight. Each of the first actuator 70, the second actuator 72, the third actuator 74 and the fourth actuator 76 in the robotic arm 22 are not actuated until the control circuit 56 receives the actuate input and the payment input. In this way the vehicle 20 will not be refueled until a payment has been processed. Additionally, the control circuit 56 receives the de-actuate input when the weight sensor 108 does not sense weight.

In use, the vehicle 20 drives onto each of the sensing units 94 and the lifting unit 52 and the actuator position the control panel 16 to be accessible the driver 18 in the vehicle 20. The driver 18 processes a payment with either a financial transaction card or currency and the driver 18 depresses a respective fuel button 90 according to the driver's 18 preference. The robotic arm 22 is actuated to insert the fuel nozzle 66 into the refueling port 23 in the vehicle 20 for refueling the vehicle 20. In this way the vehicle 20 can be refueled without requiring the driver 18 to exit the vehicle 20 thereby reducing the transmission diseases between multiple drivers.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated fueling assembly for automatically refueling a vehicle at a gas station, said assembly comprising:

a refueling station being positioned at a gas station for refueling gas burning vehicles, said refueling station including a control panel being movably integrated into said refueling station, said control panel being actuatable into an extended position thereby facilitating a driver of a vehicle that has parked adjacent to said refueling station to access said control panel without exiting the vehicle, said refueling station including a robotic arm being movably integrated into said refueling station, said robotic arm being actuatable to extend into a refueling port in the vehicle for refueling the vehicle without requiring the driver to exit the vehicle, said refueling station including a housing having a bottom wall, a top wall and an outer wall extending between said bottom wall and said top wall, said outer wall having a first lateral side, a second lateral side and a front side, said housing having a slot extending through said first lateral side, said slot being elongated to extend substantially between said bottom wall and said top wall, said control panel being disposed on said front side, said housing having a channel extending through said front side, said channel extending substantially between said bottom wall and said top wall, said channel being positioned closer to said second lateral side than said first lateral side; and a pair of sensing units, each of said sensing units being positioned on a driveway adjacent to said refueling station such that the vehicle drives over said sensing units when the vehicle parks next to said refueling station, each of said sensing units being in communication with said refueling station, said refueling station being turned on when each said sensing units senses the weight of the vehicle.

2. The assembly according to claim 1, wherein said refueling unit includes:

a control actuator being movably integrated into said front side of said outer wall of said housing, said control actuator having a distal end with respect to said front side, said control panel being positioned on said distal end;

said control actuator being actuatable into a retracted position having said control actuator being recessed into said front side such that said control panel is aligned with said front side;

said control actuator being actuatable into an extended position having said control panel being spaced from said front side thereby facilitating said control panel be accessible to the driver of the vehicle; and said control panel has an exposed surface with respect to said control actuator.

3. The assembly according to claim 1, wherein said refueling station includes a lifting unit being integrated into said housing, said lifting unit having an engagement extending outwardly through said channel in said front side of said outer wall of said housing, said engagement traveling upwardly or downwardly in said channel, said engagement being coupled to said actuator for moving said actuator upwardly or downwardly along said front side of said outer wall of said housing thereby facilitating said actuator to be aligned with a driver's side window of a variety of types of vehicles.

4. The assembly according to claim 2, wherein said refueling station includes a control circuit being positioned in the housing, said control circuit being electrically coupled to a power source comprising an electrical system of the gas station, said control circuit receiving an actuate input, said control circuit receiving a de-actuate input, said control circuit receiving a payment input, said control circuit being electrically coupled to said control actuator, said control actuator being actuated into said extended position when said control circuit receives said actuate input, said control actuator being actuated into said retracted position when said control circuit receives said de-actuate input.

5. The assembly according to claim 4, wherein:

said robotic arm includes a first section, a second section being pivotally attached to said first section and a third section being pivotally attached to said second section;

said first section extends outwardly from said slot in said first lateral side of said outer wall of said housing;

second section lies on a plane being oriented parallel to said first lateral side of said outer wall;

said third section lies on a plane being oriented parallel to said first lateral side of said outer wall, said third section having a distal end with respect to said second section;

said robotic arm has a fuel nozzle extending away from said distal end;

said robotic arm includes a first actuator being positioned within said housing, said first actuator being electrically coupled to said control circuit, said first actuator urging said first section upwardly or downwardly in said slot;

said robotic arm includes a second actuator being positioned at an intersection between said first section and said second section, said second actuator being electrically coupled to said control circuit, said second actuator rotating said second section about said first section; and said robotic arm includes a third actuator being positioned at an intersection between said second section and said third section, said third actuator being electrically coupled to said control circuit, said third actuator rotating said third section about said second section.

6. The assembly according to claim 5, wherein said refueling station includes:

a lifting unit being movably integrated into said housing, said lifting unit being mechanically coupled to said control actuator; and an alignment camera being coupled to said front side of said outer wall of said housing such that said alignment camera is configured to imagery of the vehicle, said alignment camera being electrically coupled to said control circuit, said control circuit analyzing the imagery of the vehicle thereby facilitating said control circuit to actuate said lifting unit to align said control actuator with the driver's side window, said control circuit actuating each of said first actuator and said second actuator and said third actuator to urge said robotic arm into a strategic orientation for inserting said fuel nozzle into the refueling port in the vehicle.

7. The assembly according to claim 4, wherein said refueling station includes a display being coupled to said exposed surface of said control panel such that said display is visible to the driver of the vehicle, said display being electrically coupled to said control circuit, said display displaying indicia comprising words and numbers for communicating operational parameters of said refueling station to the driver.

8. The assembly according to claim 4, wherein said refueling station includes a card reader being integrated into said exposed surface of said control panel thereby facilitating said card reader to receive a financial transaction card for processing a payment, said card reader being electrically coupled to said control circuit, said control circuit receiving said payment input when said card reader successfully processes a payment with the financial transaction card.

9. The assembly according to claim 4, wherein said refueling station includes a keypad being integrated into said exposed surface of said control panel such that said keypad is accessible to the driver, said keypad being electrically coupled to said control circuit for programming operational parameters into said refueling station including numerical data pertaining to said card reader for processing the payment.

10. The assembly according to claim 4, wherein said refueling unit includes a plurality of fuel buttons, each of said fuel buttons being movably integrated into said exposed surface of said control panel such that each of said fuel buttons is accessible to the driver, each of said fuel buttons being electrically coupled to said control circuit, each of said fuel buttons being in communication with a respective one of a plurality of fuel pumping units in the gas station, said robotic arm being in fluid communication with each of the fuel pumping units, a respective one of the fuel pumping units being turned on when said fuel button associated with the respective fuel pumping unit is depressed thereby facilitating said robotic arm to dispense fuel into the refueling port in the vehicle.

11. The assembly according to claim 1, wherein each of said sensing units comprises a panel having a lower surface, an upper surface and a perimeter surface extending between said lower surface and said upper surface, said perimeter surface angling inwardly between said lower surface and said upper surface such that said panel has a trapezoidal shape, said lower surface resting on the driveway, said panel associated with each of said sensing units being aligned with a respective one of said first lateral side and said second lateral side of said outer wall of said housing thereby facilitating panel associated with each of said sensing units to be aligned with a respective one of a set of rear wheels and a set of front wheels of the vehicle.

12. The assembly according to claim 11, wherein:

said refueling station includes a control circuit, said control circuit receiving an actuate input and a de-actuate input; and a weight sensor being integrated into said upper surface of said panel such that said weight sensor senses the weight of the vehicle when the vehicle drives onto said panel, said weight sensor being electrically coupled to said control circuit, said control circuit receiving said actuate input when said weight sensor senses weight, said control circuit receiving said de-actuate input when said weight sensor does not sense weight.

13. An automated fueling assembly for automatically refueling a vehicle at a gas station, said assembly comprising:

a refueling station being positioned at a gas station for refueling gas burning vehicles, said refueling station including a control panel being movably integrated into said refueling station, said control panel being actuatable into an extended position thereby facilitating a driver of a vehicle that has parked adjacent to said refueling station to access said control panel without exiting the vehicle, said refueling station including a robotic arm being movably integrated into said refueling station, said robotic arm being actuatable to extend into a refueling port in the vehicle for refueling the vehicle without requiring the driver to exit the vehicle, said refueling station comprising:

a housing having a bottom wall, a top wall and an outer wall extending between said bottom wall and said top wall, said outer wall having a first lateral side, a second lateral side and a front side, said housing having a slot extending through said first lateral side, said slot being elongated to extend substantially between said bottom wall and said top wall, said control panel being disposed on said front side, said housing having a channel extending through said front side, said channel extending substantially between said bottom wall and said top wall, said channel being positioned closer to said second lateral side than said first lateral side;

a control actuator being movably integrated into said front side of said outer wall, said control actuator having a distal end with respect to said front side, said control panel being positioned on said distal end, said control actuator being actuatable into a retracted position having said control actuator being recessed into said front side such that said control panel is aligned with said front side, said control actuator being actuatable into an extended position having said control panel being spaced from said front side thereby facilitating said control panel be accessible to the driver of the vehicle, said control panel having an exposed surface with respect to said control actuator;

a lifting unit being integrated into said housing, said lifting unit having an engagement extending outwardly through said channel in said front side of said outer wall of said housing, said engagement traveling upwardly or downwardly in said channel, said engagement being coupled to said control actuator for moving said control actuator upwardly or downwardly along said front side of said outer wall of said housing thereby facilitating said control actuator to be aligned with a driver's side window of a variety of types of vehicles;

a control circuit being positioned in the housing, said control circuit being electrically coupled to a power source comprising an electrical system of the gas station, said control circuit receiving an actuate input, said control circuit receiving a de-actuate input, said control circuit receiving a payment input, said control circuit being electrically coupled to said control actuator, said control actuator being actuated into said extended position when said control circuit receives said actuate input, said control actuator being actuated into said retracted position when said control circuit receives said de-actuate input, said control circuit being electrically coupled to said lifting unit;

wherein said robotic arm includes a first section, a second section being pivotally attached to said first section and a third section being pivotally attached to said second section, said first section extending outwardly from said slot in said first lateral side of said outer wall of said housing, second section lying on a plane being oriented parallel to said first lateral side of said outer wall, said third section lying on a plane being oriented parallel to said first lateral side of said outer wall, said third section having a distal end with respect to said second section, said robotic arm having a fuel nozzle extending away from said distal end, said robotic arm including a first actuator being positioned within said housing, said first actuator being electrically coupled to said control circuit, said first actuator urging said first section upwardly or downwardly in said slot, said robotic arm including a second actuator being positioned at an intersection between said first section and said second section, said second actuator being electrically coupled to said control circuit, said second actuator rotating said second section about said first section, said robotic arm including a third actuator being positioned at an intersection between said second section and said third section, said third actuator being electrically coupled to said control circuit, said third actuator rotating said third section about said second section;

an alignment camera being coupled to said front side of said outer wall of said housing such that said alignment camera is configured to capture imagery of the vehicle, said alignment camera being electrically coupled to said control circuit, said control circuit analyzing the imagery of the vehicle thereby facilitating said control circuit to actuate said lifting unit to align said actuator with the driver's side window, said control circuit actuating each of said first actuator and said second actuator and said third actuator to urge said robotic arm into a strategic orientation for inserting said fuel nozzle into the refueling port in the vehicle;

a display being coupled to said exposed surface of said control panel such that said display is visible to the driver of the vehicle, said display being electrically coupled to said control circuit, said display displaying indicia comprising words and numbers for communicating operational parameters of said refueling station to the driver;

a card reader being integrated into said exposed surface of said control panel thereby facilitating said card reader to receive a financial transaction card for processing a payment, said card reader being electrically coupled to said control circuit, said control circuit receiving said payment input when said card reader successfully processes a payment with the financial transaction card;

a keypad being integrated into said exposed surface of said control panel such that said keypad is accessible to the driver, said keypad being electrically coupled to said control circuit for programming operational parameters into said refueling station including numerical data pertaining to said card reader for processing the payment; and a plurality of fuel buttons, each of said fuel buttons being movably integrated into said exposed surface of said control panel such that each of said fuel buttons is accessible to the driver, each of said fuel buttons being electrically coupled to said control circuit, each of said fuel buttons being in communication with a respective one of a plurality of fuel pumping units in the gas station, said robotic arm being in fluid communication with each of the fuel pumping units, a respective one of the fuel pumping units being turned on when said fuel button associated with the respective fuel pumping unit is depressed thereby facilitating said robotic arm to dispense fuel into the refueling port in the vehicle;

a pair of sensing units, each of said sensing units being positioned on a driveway adjacent to said refueling station such that the vehicle drives over said sensing units when the vehicle parks next to said refueling station, each of said sensing units being in communication with said refueling station, said refueling station being turned on when each said sensing units senses the weight of the vehicle, each of said sensing units comprising:

a panel having a lower surface, an upper surface and a perimeter surface extending between said lower surface and said upper surface, said perimeter surface angling inwardly between said lower surface and said upper surface such that said panel has a trapezoidal shape, said lower surface resting on the driveway, said panel associated with each of said sensing units being aligned with a respective one of said first lateral side and said second lateral side of said outer wall of said housing thereby facilitating panel associated with each of said sensing units to be aligned with a respective one of a set of rear wheels and a set of front wheels of the vehicle; and a weight sensor being integrated into said upper surface of said panel such that said weight sensor senses the weight of the vehicle when the vehicle drives onto said panel, said weight sensor being electrically coupled to said control circuit, said control circuit receiving said actuate input when said weight sensor senses weight, said control circuit receiving said de-actuate input when said weight sensor does not sense weight.

* * * * *